(12) United States Patent
Ahmadi et al.

(10) Patent No.: US 7,974,312 B2
(45) Date of Patent: Jul. 5, 2011

(54) COMPRESSED MEDIUM ACCESS CONTROL (MAC) HEADER STRUCTURE FOR MAC OVERHEAD REDUCTION IN MOBILE WORLDWIDE INTEROPERABILITY FOR MICROWAVE ACCESS (WIMAX) SYSTEMS

(75) Inventors: Sassan Ahmadi, Portland, OR (US); Muthaiah Venkatachalam, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 299 days.

(21) Appl. No.: 11/831,299

(22) Filed: Jul. 31, 2007

(65) Prior Publication Data

US 2009/0034526 A1 Feb. 5, 2009

(51) Int. Cl.
*H04J 3/18* (2006.01)
*H04J 3/06* (2006.01)

(52) U.S. Cl. ........................ 370/477; 370/503
(58) Field of Classification Search ................ None
See application file for complete search history.

(56) References Cited

U.S. PATENT DOCUMENTS

| | | | |
|---|---|---|---|
| 5,936,967 A * | 8/1999 | Baldwin et al. | 370/474 |
| 2002/0191691 A1* | 12/2002 | Holborow | 375/240 |
| 2004/0258092 A1* | 12/2004 | Sugaya | 370/474 |
| 2005/0286451 A1* | 12/2005 | Kim et al. | 370/310 |
| 2007/0098007 A1* | 5/2007 | Prodan et al. | 370/443 |
| 2008/0069148 A1* | 3/2008 | Wu | 370/498 |
| 2008/0285501 A1* | 11/2008 | Zhang et al. | 370/315 |
| 2009/0010243 A1* | 1/2009 | Hiddink | 370/346 |
| 2009/0080351 A1* | 3/2009 | Ryu et al. | 370/312 |

OTHER PUBLICATIONS

IEEE Standard 802.16e-2005, 2006, p. 649.*
"Part 16: Air Interface for Broadband Wireless Access Systems, Advanced Air Interface", LAN/MAN Standards Committee of the IEEE Computer Society, Jul. 29, 2010, 999 pages.

* cited by examiner

*Primary Examiner* — Hong Cho
*Assistant Examiner* — Eunsook Choi
(74) *Attorney, Agent, or Firm* — Kacvinsky Daisak PLLC

(57) ABSTRACT

A packet data structure comprising a compressed medium access control (MAC) header structure capable of significantly reducing MAC header overhead for small payload applications, such as Voice over Internet Protocol (VoIP) and interactive gaming and to increase the capacity of such applications. In various implementations, the packet data structure may be used in mobile Worldwide Interoperability for Microwave Access (WiMAX) systems designed to operate in accordance with the Institute for Electronic and Electrical Engineers (IEEE) standards such as the 802.16e-2005 standard and/or the evolving IEEE 802.16m standard. Various embodiments are described and claimed.

27 Claims, 4 Drawing Sheets

Group of Users with Common CID_MSB (Truncation of CID)

(Splitting of CID into User_ID and User-Connection-ID)

COMPRESSED MEDIUM ACCESS CONTROL (MAC) HEADER STRUCTURE FOR MAC OVERHEAD REDUCTION IN MOBILE WORLDWIDE INTEROPERABILITY FOR MICROWAVE ACCESS (WIMAX) SYSTEMS

BACKGROUND

Mobile Worldwide Interoperability for Microwave Access (WiMAX) is a broadband wireless technology for fixed and mobile broadband networks to enable broadband data services including data, streaming video, and voice. Mobile WiMAX systems may operate in accordance with standards such as the Institute for Electronic and Electrical Engineers (IEEE) 802.16e-2005 standard, "Air Interface for Fixed and Mobile Broadband Wireless Access Systems," (February, 2005) and the evolving IEEE 802.16m standard, "Advanced Air Interface."

The medium access control (MAC) layer of IEEE 802.16e-2005 was originally inherited from Data Over Cable Service Interface Specification (DOCSIS) standard. For IEEE 802.16e-2005 and mobile WiMAX, each MAC Protocol Data Unit (PDU) includes a Generic MAC header followed by a payload or Service Data Unit (SDU) and a Cyclic Redundancy Check (CRC). The CRC is 4 octets and is based on IEEE 802.3 and calculated on the entire MAC PDU including the MAC header and the payload.

The Generic MAC Header (GMH) and the Bandwidth Request (BW-REQ) header are two types of MAC headers. As defined in IEEE 802.16e-2005, the size of the GMH is 6 octets: Header Type (HT) (1 bit), Encryption Control (EC) (1 bit), Payload Type (6 bits), Reserved (Rsv) (1 bit), CRC indicator (CI) (1 bit), Encryption Key Sequence (EKS) (2 its), Rsv (1 bit), Payload Length most significant bits (LEN MSB) (3 bits), Payload Length least significant bits (LEN LSB) (8 bits), Connection Identifier most significant bits (CID MSB) (8 bits), Connection Identifier least significant bits (CID LSB) (8 bits), and Header Check Sequence (HCS) (8 bits). The size of the BW-REQ header also is 6 octets: HT (1 bit), EC (1 bit), Bandwidth Request Type (3 bits), Bandwidth Request most significant bits (BR MSB) (11 bits), Bandwidth Request least significant bits (BR LSB) (8 bits), CID MSB (8 bits), CID LSB (8 bits), and (HCS) (8 bits).

The size of MAC header is a significant overhead for certain applications such as Voice over Internet Protocol (VoIP) and interactive gaming, which are both delay sensitive and typically include frequent small payloads. Depending on the type of voice codec employed, such as the Adaptive Multi-Rate (AMR) codec as an example, the size of VoIP Real-time Transport Protocol (RTP) payloads are typically less than 40 octets (e.g., 20 octets for ITU-T G.729). Therefore, a VoIP packet encapsulated in a MAC PDU may have between 25% to 50% overhead due to the size of the MAC header and the trailing CRC. Furthermore, in VoIP and interactive gaming applications, most of the fields in the conventional MAC header usually are not used to the full extent.

The IEEE 802.16e-2005 standard was designed for data applications and with maximal flexibility. Nevertheless, the increasing demand from cellular operators for increased VoIP capacity and the emergence of new applications such as interactive gaming require MAC overhead reduction techniques and more efficient alternatives to the conventional MAC header.

DETAILED DESCRIPTION

Various embodiments are directed to a packet data structure comprising a compressed MAC header structure capable of significantly reducing MAC header overhead for small payload applications, such as VoIP and interactive gaming applications, and thereby to increase the capacity of such applications. In various implementations, the packet data structure may be used in mobile WiMAX systems designed to operate in accordance with the IEEE 802.16e-2005 standard and/or the evolving IEEE 802.16m standard.

It can be appreciated that while exemplary embodiments may be described in the context of mobile WiMAX systems and/or the IEEE 802.16e-2005 and IEEE 802.16m standards for purposes of illustration, the aspects and advantages described herein may be applicable to improve other wireless communications systems and standards in accordance with the described embodiments. For example, some embodiments may be compatible with devices and/or networks operating in accordance with existing IEEE 802.11, 802.11a, 802.11b, 802.11e, 802.11g, 802.11 h, 802.11i, 802.11n, 802.16, 802.16d, 802.16e standards as well as future versions, derivatives, or evolution of the above standards.

Figure 1:
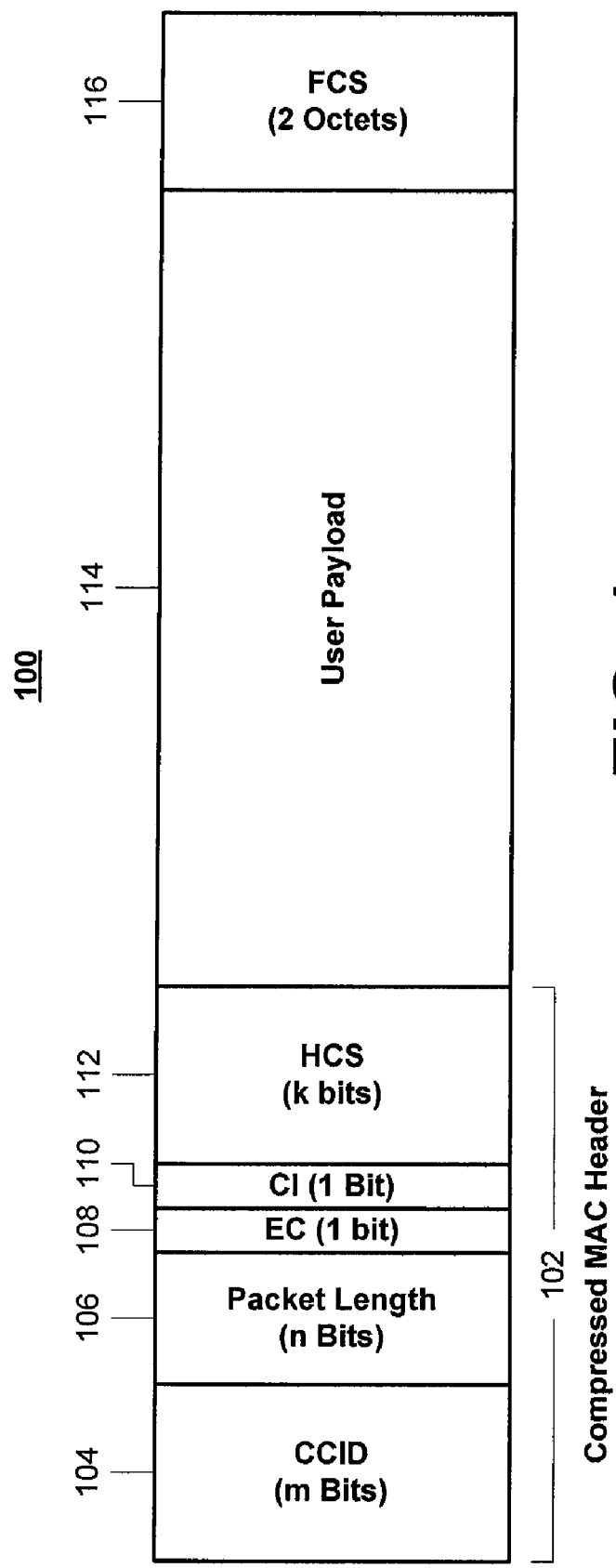
FIG. 1 illustrates a packet data structure comprising a compressed MAC header structure in accordance with various embodiments.

FIG. 1 illustrates one embodiment of a packet data structure 100. As shown, the packet data structure 100 may comprise a compressed MAC header structure 102. In various implementations, compressed MAC header structure 102 may be arranged to simplify the contents of and/or remove redundancies for small-packet applications, such as VoIP and interactive gaming. Compressed MAC header structure 102 may comprise a compact connection identifier (CCID) field 104, a packet length field 106, an encryption control (EC) field 108, a CRC indicator (CI) field 110, and a header check sequence (HCS) field 112. Packet data structure 100 also may comprise a user data payload field 114 and a frame check sequence (FCS) field 116.

In various embodiments, CCID field 104 may be arranged to include an m-bit CCID value for identifying a transport or management connection between a base station and a mobile station. When established, a connection may comprise a uni-directional logical link between the base station and the mobile station in either the downlink (DL) or uplink (UL) direction. In various implementations, DL and UL connections may comprise, for example, transport connections for the transmission of user data traffic flows and management connections for the transmission of MAC control and/or signaling data.

Each m-bit CCID value may serve as a temporally unique address for data and/or MAC management transmissions over air-interface for a specific user. The m-bit CCID value may have a fewer number of bits than a conventional connection identifier (CID) for a GMH or a BW-REQ header. In an exemplary embodiment, the m-bit CCID value may comprise 4 bits (e.g., m=4). It can be appreciated, however, that other values of m may also be utilized to reduce the size of MAC header overhead provided that the CCID value includes a fewer number of bits compared to a full 16-bit CID for a GMH or a BW-REQ header (e.g., m<<16). It is noted that the m-bit CCID value may be used in either the DL or UL direction and may be used to replace transport connection CIDs as well as management connection (e.g., basic, primary, and secondary) CIDs.

Packet length field 106 may be arranged to include an n-bit packet length value for indicating the size of the user data payload to be included in user data payload field 114. In various embodiments, the n-bit packet length value may comprise as few as 6 bits corresponding to the maximum size of the user data payload of 64 octets, which is suitable for VoIP and interactive gaming applications. For example, a statistical analysis based on available statistical models for VoIP and interactive gaming payloads suggests that the average length of VoIP user packets is less than 40 octets (e.g., 7 to 33 octets for 3 GPP AMR voice codec), and the average length of interactive gaming user packets is less than 64 octets. Therefore, packet length field 106 may include an n-bit packet length value as small as 6 bits. In exemplary embodiment, the n-bit packet length value may comprise 6 bits (e.g., n=6). It can be appreciated, however, that other values of n may be utilized.

EC field 108 may be arranged to include a 1-bit EC value for indicating encryption of the user data payload. In various implementations, the user data payload may be encrypted or unencrypted. In an exemplary embodiment, the EC value may indicate that the user data payload is encrypted if set to 1 (e.g., EC=1) and otherwise (e.g., EC=0) that the user data payload is not encrypted. It can be appreciated that other mechanisms for indicating user data encryption may be utilized.

CI field 110 may be arranged to include a 1-bit CI value for indicating that a CRC value (generally known as FCS) follows the user data payload in FCS field 116. In various implementations, a CRC value may be calculated after encryption based on the compressed MAC header 102 and user data payload field 114. The use of a CRC value may depend on the user application. In an exemplary embodiment, the CI value may indicate that the user data payload is followed by a CRC value if set to 1 (e.g., CI=1) and otherwise (e.g., CI=0) that no CRC value follows the user data payload. It can be appreciated that other mechanisms for indicating a CRC value may be utilized.

HCS field 112 may be arranged to include a k-bit header check sequence (HCS) value to provide error protection for the compressed MAC header structure 102. In an exemplary embodiment, a k-bit (0<=k<8) HCS value included in HCS field 112 shall follow and be calculated exclusively on the other fields (i.e., CCID, Length, EC, and CI) of the compressed MAC header structure 102. In various implementations, Cyclic Redundancy Check 4 (CRC-4), i.e. 4-bit CRC, is recommended for overhead reduction.

The procedure for detection and decoding of single-user payload is as follows. The CRC of the received MAC header is calculated and compared against the HCS value. If HCS check is successful, the CCID, Length, EC, and CI fields are detected. Otherwise; if HCS check fails, the packet is discarded, and no negative acknowledge (NACK) is transmitted. If CRC is enabled (e.g., CI=1), the CRC of the packet is calculated and compared against CRC field value. If CRC check is successful, the payload is decoded and an ACK (acknowledge) is transmitted. If CRC check fails and if retransmission is allowed, a NACK is sent and retransmission is requested.

In various implementations, packet data structure 100 comprising compressed MAC header structure 102 may enable more efficient handling of small data packets, such as VoIP and interactive gaming data packets, with lower overhead. For example, MAC header overhead may be reduced for small-packet applications by a factor of up to 60%, depending on the system configuration. It can be appreciated that, in some embodiments, the conventional 10 octet overhead corresponding to GMH (6 octets) and CRC (4 octets) for each user data packet may be reduced to 4 octets corresponding to the compressed MAC header field 102 (2 octets) and the FCS field 116 (2 octets). This reduction in MAC header overhead may translate directly into higher capacity and performance for small-packet applications such as VoIP and interactive gaming which are expected to dominate service offerings of cellular networks.

Packet data structure 100 comprising compressed MAC header structure 102 may be designated for use by one or more small-packet applications, such as VoIP and interactive gaming applications. It can be appreciated, however, that the embodiments are not limited in this regard. For example, compressed MAC header structure 102 may find applicability in various small-packet applications which would benefit from MAC header overhead reduction. In some embodiments, use of compressed MAC header structure 102 may be employed based on the relationship of a conventional MAC header and CRC to the user data payload. For instance, if the ratio of the overhead corresponding to a conventional MAC header (e.g., GMH or BW-REQ header) and CRC to the user data payload would be greater than a certain threshold (e.g., 25%), then significant MAC overhead reduction could be achieved by utilizing compressed MAC header structure 102.

In various implementations, packet data structure 100 comprising compressed MAC header structure 102 may be implemented as a MAC PDU to be transmitted over a mobile WiMAX air interface between a base station and a mobile station. For example, the mobile WiMAX air interface may support OFDMA techniques, and MAC PDU may be implemented within an OFDMA frame. It can be appreciated that compressed MAC header structure 102 does not impose any additional complexity on the mobile WiMAX air-interface including base station and mobile station implementations.

OFDMA techniques may involve multiplexing operations for subdividing bandwidth into multiple frequency subcarriers. OFDMA techniques may improve multi-path performance by coding and interleaving information across subcarriers prior to transmission. When implemented by an OFDM frame, MAC PDU may be included in a DL subframe or a UL subframe. For example, an OFDM frame for TDD (Time Division Duplex) operation may comprise DL and UP subframes, and MAC PDU may be included in a DL burst within the DL subframe or in a UL burst within a UL subframe.

In addition to the MAC PDU, an OFDM frame may comprise various control information such as a preamble used for synchronization, a Frame Control Header (FCH) used for frame configuration information (e.g., burst profile, burst length), an uplink media access protocol MAP (UL-MAP) to indicate UL usage, a downlink MAP (DL-MAP) to indicate DL usage, a UL ranging sub-channel used for random access and adjustments (e.g., time, frequency, power) and bandwidth requests, a UL Channel Quality Indicator Channel (CQICH) for reporting channel state information, and a UL Acknowledge (ACK) channel for Hybrid Automatic Repeat Request (HARQ) ACK/NACK signaling.

It can be appreciated that the described embodiments may be implemented by the MAC layer of a wireless device designed to operate in accordance with the IEEE 802.16e-2005 standard and/or the evolving IEEE 802.16m standard. For example, the MAC layer of a base station or mobile station may implement aspects of the described embodiments as part of DL and/or UL packet detection and decoding procedures required to extract the user data payloads in order to significantly increase the capacity and performance of small-packet applications such as VoIP and interactive gaming.

It also can be appreciated that it may be necessary to distinguish use of the compressed MAC header structure 102 from conventional MAC headers (e.g., GMH and BW-REQ header) so that the described embodiments are compatible with legacy devices and/or networks operating in accordance with existing IEEE standards such as IEEE 802.16e-2005, as well as with devices and/or networks operating in accordance with future versions, derivatives, or the evolution of the above standards (e.g., IEEE 802.16m). It is noted that the current structure and contents of GMH do not allow addition of version control or any other indicators.

An OFDMA frame may include multiple zones in which either Full Usage of Subchannels (FUSC) or Partial Usage of Subchannels (PUSC) can be implemented. A permutation zone may comprise a number of contiguous OFDMA symbols, in the DL or UL, that use the same permutation scheme. The DL subframe or the UL subframe may contain more than one permutation zone. The permutation formula may map subchannels to physical subcarriers in the OFDMA symbol. The permutation formula may vary for the DL and UL and for FUSC and PUSC schemes.

In some embodiments, the compressed MAC header structure 102 may be used exclusively in certain permutation zones such as permutation zones corresponding to VoIP and/or interactive gaming user traffic. Time Division Multiplexing (TDM) technique may be used to separate permutation zones supported by legacy mobile WiMAX systems from the new permutation zones supported by the IEEE 802.16m systems. In such embodiments, the compressed MAC header structure 102 can be exclusively used in the new permutation zones for VoIP and interactive gaming user-traffic allocations to ensure that both new and legacy terminals can be scheduled and receive service from a base station.

In various embodiments, use of compressed MAC header structure 102 may be indicated prior to establishing a connection between a base station and a mobile station in order to ensure that both new and legacy mobile stations can schedule and receive service from the base station. The base station may periodically transmit to serving sector(s) link description messages such as a downlink channel descriptor (DCD) message to indicate characteristics of DL channel and an uplink channel descriptor (UCD) message to indicate characteristics of UL channel. The UCD and DCD messages may contain burst profile information, modulation information, error-correction information, preamble length, and so forth. In some embodiments, DCD and/or UCD messages periodically sent by the base station may comprise a length value indicating the size of the m-bit CCID value. By advertising the length of the m-bit CCID value in the DCD and/or UCD message, both new and legacy mobile stations attached to the base station may know in advance to expect a connection identifier comprising m-bits (e.g., m=4). The size of CCID (i.e., the value of m) can also be specified by the IEEE 802.16m standard as a fixed value and therefore, no advertisement would be necessary.

To create a connection, a base station and a mobile station may exchange various messages such as dynamic service flow addition (DSA) messages. For some service flows, such as pre-provisioned service flows, connection creation may be initiated by the base station. In such cases, the base station may send a DSA request (DSA-REQ) message to the mobile station, and the mobile station may confirm creation of the connection by sending a DSA response (DSA-RSP) message to the base station. For other service flows, such as non-preprovisioned service flows, connection creation may be initiated by the mobile station. In such cases, the mobile station may send a DSA-REQ message, and the base station may respond with a DSA-RSP message to confirm creation of the connection.

In some embodiments, use of the compressed MAC header structure 102 can be signaled prior to establishing a connection between base station and the mobile station using a type-length-value (TLV) included in one or more DSA messages (e.g., DSA-REQ message and/or DSA-RSP message). The TLV value may indicate that compressed MAC header structure 102 will be used for a particular connection to be established between the base station and the mobile station. By signaling prior to connection creation, compressed MAC header structure 102 can be used even in legacy zones without confusing legacy mobile stations.

Figure 2A:
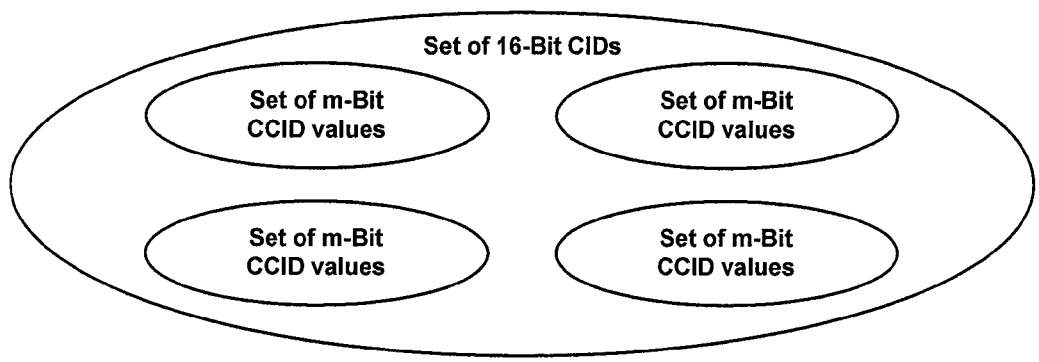
FIGS. 2A-C illustrates compact connection identifier (CCID) value selection in accordance with various embodiments.

FIG. 2A illustrates one embodiment of CCID value selection. In various implementations, a connection established between a base station and a mobile station may be assigned an m-bit CCID value, where m<<16 bits. It can be appreciated that using a CCID value reduces the number of unique transport connections as compared to using conventional full 16-bit CIDs. To mitigate this drawback, sets of CCID values may be chosen according to certain provisions.

As shown, the set of conventional 16-bit CIDs includes several sets of m-bit CCID values. Each set of m-bit CCID values may comprise $2^m$ distinct CCID values (e.g., 16 distinct CCID values, where m=4). In various embodiments, a base station may be arranged to assign conventional CIDs in a serving sector among user transport connections according to a certain mapping such that CIDs are grouped by a common portion. For example, the base station may group 16-bit CIDs which have the same MSB portion (e.g., most significant 12 bits) and may maintain awareness of the CIDs that are available and in use by mobile stations.

Figure 2B:
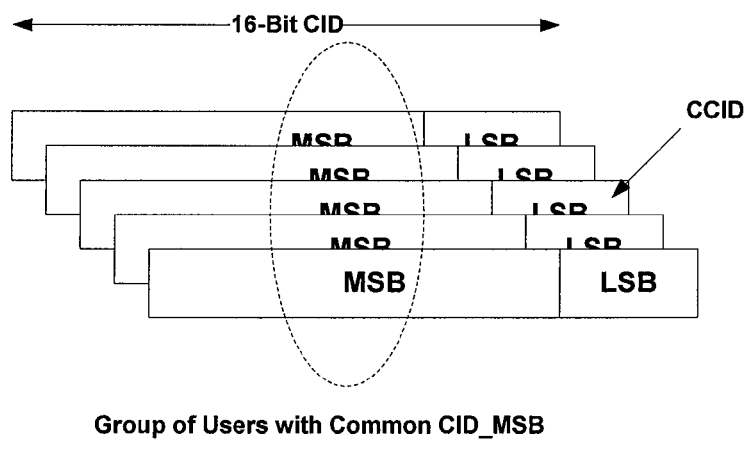

As shown in FIG. 2B, in various implementations, the MSB portion of a group of 16-bit CIDs may be the same. As such, the common portion (e.g., 12-bit MSB portion) of the full 16-bit CIDs may be truncated while maintaining only the differing portions (e.g., 4-bit LSB portions). Each set of m-bit CCID values may comprise the LSB portions of truncated 16-bit CIDs grouped by common MSB portion. In various embodiments, the base station may assign CCID values to user transport connections according to a certain mapping such that each CCID value may comprise an m-bit value (e.g., m<<16) derived from the 4-bit LSB portion of a truncated 16-bit CID.

Conceptually, truncating CIDs in this way is similar to the notion of Reduced CID (RCID) described in the IEEE 802.16e-2005 standard, where the RCID is the LSB portion of the set of CIDs that have been currently assigned and are in use by mobile stations. In accordance with the described embodiments, however, truncating can be used to overcome the limitation on the number of unique CCID values that can be simultaneously assigned to a specific user traffic.

Figure 2C:
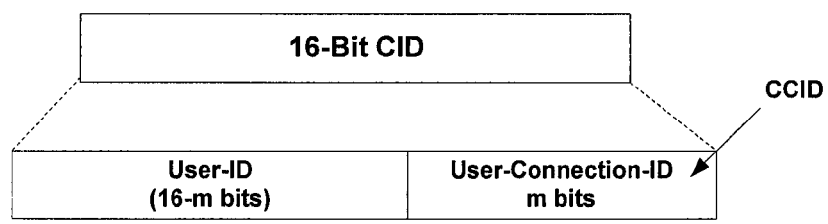

As shown in FIG. 2C, in an alternative implementation, the 16-bit CID may be split into two parts. The MSB portion of the CID may identify the users (i.e., User-ID) and the LSB portion of the CID may identify the management or transport connections corresponding to a specific user (i.e., User-Connection-ID). The User-ID may be signaled through common or dedicated signaling or messaging channels whereas the User-Connection-ID can be specified as part of the compressed MAC header through CCID field. In this case, User-Connection-ID and CCID values are the same.

Figure 3:
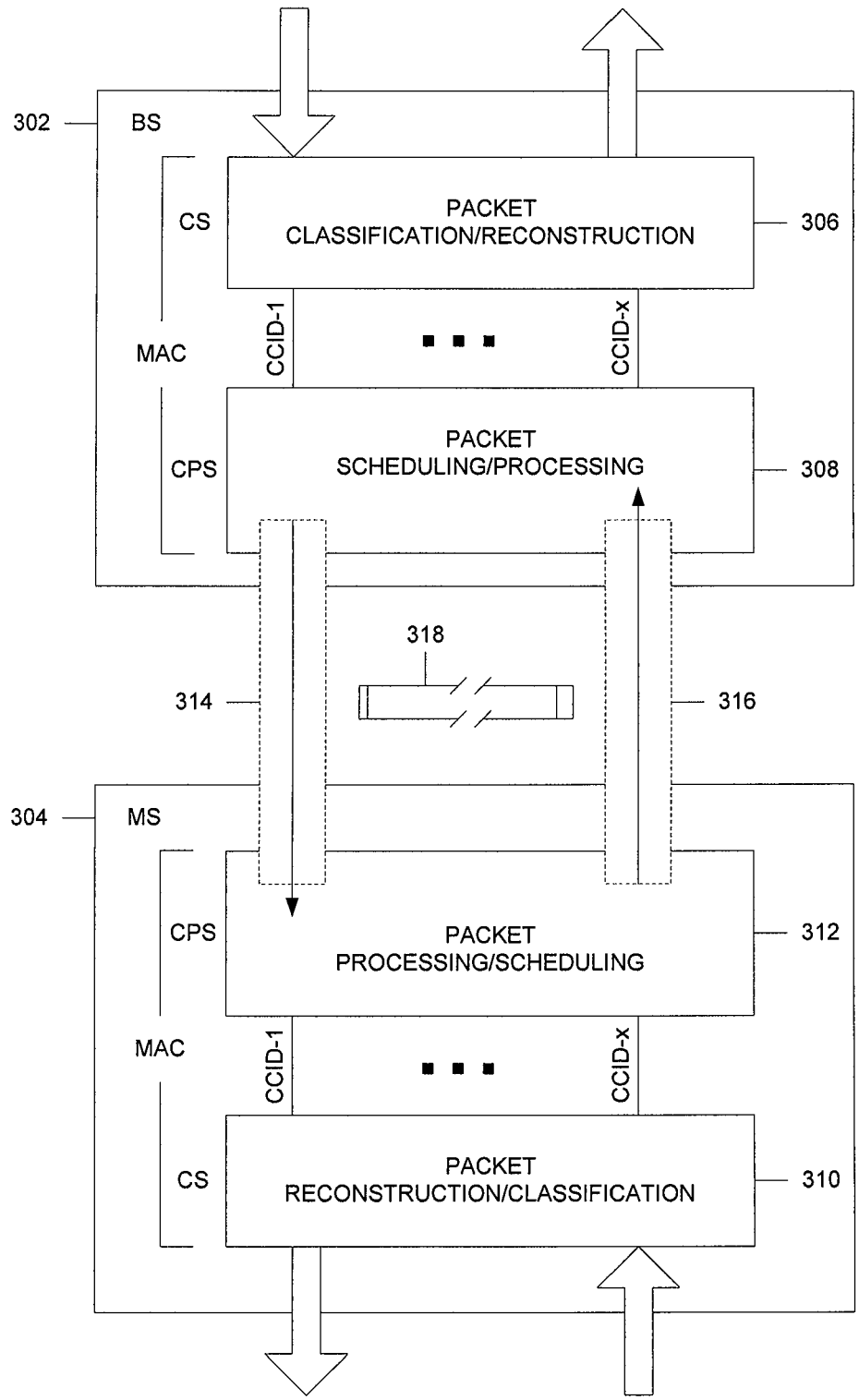
FIG. 3 illustrates a mobile WiMAX system in accordance with various embodiments.

FIG. 3 illustrates one embodiment of a mobile WiMAX system 300. In various embodiments, mobile WiMAX system 300 may operate in accordance with the IEEE 802.16e-2005 standard and/or the evolving IEEE 802.16m standard. It can be appreciated that aspects and advantages described herein may be applicable to improve other wireless communications systems and standards.

Mobile WiMAX system 300 may support various communication and/or modulation techniques such as Frequency Division Multiplexing (FDM), Orthogonal FDM (OFDM), Orthogonal Frequency Division Multiple Access (OFDMA), Scalable OFDMA (S-OFDMA), Coded OFDM (COFDM), Time Division Multiplexing (TDM), Time Division Multiple Access (TDMA), Extended TDMA (E-TDMA), Time-Division Duplex (TDD), Frequency Division Duplex (FDD), Quadrature Phase Shift Keying (QPSK), Offset QPSK (OQPSK), Differential QPSK (DQPSK), Quadrature Amplitude Modulation (QAM), N-state QAM (N-QAM), Differential QAM (DQAM), and others.

Mobile WiMAX system 300 may employ various coding techniques such as CRC, Forward Error Correction (FEC), CRC, Automatic Repeat Request (ARQ), Hybrid ARQ (HARQ), Fast Channel Feedback, Convolution Code (CC), Convolution Turbo Code (CTC), Block Turbo Code, Low Density Parity Code Check (LDPC), and others.

Mobile WiMAX system 300 may support various encryption techniques such as Advanced Encryption Standard (AES) encryption, Advanced Access Content System (AACS) encryption, Data Encryption Standard (DES) encryption, Triple DES (3DES) encryption, Rivest, Shamir, and Adleman (RSA) encryption, Elliptic curve cryptography (ECC) encryption, and others.

Mobile WiMAX system 300 may utilize various antenna techniques such as Multiple Input Multiple Output (MIMO), Adaptive MIMO (A-MIMO), Single Input Multiple Output (SIMO), Multiple Input Single Output (MISO), Adaptive or Advanced Antenna System (AAS), and/or other intelligent or multiple antenna technology.

Mobile WiMAX system 300 may provide voice and/or data communications functionality in accordance with different types of systems such as Code Division Multiple Access (CDMA) systems, Global System for Mobile Communication (GSM) systems, North American Digital Cellular (NADC) systems, OFDMA systems, TDMA systems, E-TDMA systems, Narrowband Advanced Mobile Phone Service (NAMPS) systems, 3G systems such as Wide-band CDMA (WCDMA), CDMA-2000, and Universal Mobile Telephone System (UMTS) systems, GSM with GPRS systems (GSM/GPRS), CDMA/1xRTT systems, Enhanced Data Rates for Global Evolution (EDGE) systems, EV-DO systems, Evolution For Data and Voice (EV-DV) systems, High Speed Downlink Packet Access (HSDPA) systems, High Speed Uplink Packet Access (HSUPA) systems, Multi-Carrier Modulation (MDM) systems, Discrete Multi-Tone (DMT) system, Bluetooth (RTM) system, ZigBee (TM) system, and others.

Mobile WiMAX system 300 may communicate, manage, or process information in accordance with one or more protocols such as MAC protocol, Physical Layer (PHY) protocol, Physical Layer Convergence Protocol (PLCP), Dynamic Host Configuration Protocol (DHCP), File Transfer Protocol (FTP), Trivial FTP (TFTP), Simple Network Management Protocol (SNMP), Asynchronous Transfer Mode (ATM) protocol, Frame Relay protocol, Systems Network Architecture (SNA) protocol, Transport Control Protocol (TCP), Internet Protocol (IP), TCP/IP, X.25, Hypertext Transfer Protocol (HTTP), User Datagram Protocol (UDP), Multipurpose Internet Mail Extensions (MIME) protocol, Gateway Control Protocol, Media Gateway Control Protocol (MGCP), Simple Gateway Control Protocol (SGCP), Session Announcement Protocol (SAP), Session Description Protocol (SDP), Session Initiation Protocol (SIP), Remote Voice Protocol (RVP), RVP Control Protocol (RVPCP), Real Time Streaming Protocol (RTSP), Real-time Transport Protocol (RTP), Synchronized Multimedia Integration Language (SMIL) protocol, Internet Streaming Media Alliance (ISMA) protocol, and others.

As shown, mobile WiMAX system 300 may comprise a BS 302 coupled to a MS 304. The BS 302 and the MS 304 may be implemented as hardware, software, or any combination thereof, as desired for a given set of design parameters or performance constraints. BS 302 may comprise or be implemented as a wireless device or system such as a WiMAX base station, relay station (RS), mobile multihop relay BS (MMR-BS), network hub, gateway, router, and so forth. MS 304 may comprise or be implemented as wireless device or system such as a wireless client device, user terminal, laptop computer, portable computer, personal computer (PC), notebook PC, handheld computer, server computer, personal digital assistant (PDA), cellular telephone, combination cellular telephone/PDA, VoIP telephone, smart phone, pager, messaging device, media player, digital music player, game device, set-top box (STB), appliance, customer premises equipment (CPE), wireless access point (AP), a modem, Global Positioning System (GPS) device, Location Based Services (LBS) device, navigation system, and others.

In general, a wireless device may comprise one more wireless interfaces and/or components for wireless communication such as one or more transmitters, receivers, transceivers, chipsets, amplifiers, filters, control logic, network interface cards (NICs), antennas, and so forth. Examples of a transceiver may include a MIMO transceiver, SIMO transceiver, MISO transceiver, Multi Receiver Chain (MRC) transceiver, and so forth. Examples of an antenna may include an internal antenna, an external antenna, a monopole antenna, a meandered monopole antenna, a dipole antenna, a balanced antenna, a printed helical antenna, a chip antenna, a ceramic antenna, a planar inverted-F antenna (PIFA), a helical antenna, an end fed antenna, an omni-directional antenna, a circularly polarized antenna, a micro-strip antenna, a diversity antenna, a dual antenna, an antenna array, and others.

Although FIG. 3 may show a limited number of devices by way of example, it can be appreciated that mobile WiMAX system 300 may include additional devices or nodes for a given implementation. For example, WiMAX system 300 may include multiple base stations and several mobile stations. In addition, BS 302 may form part of an Access Service Network (ASN) and be coupled to an Access Service Network Gateway (ASN-GW). The ASN-GW may couple BS 302 to a Connectivity Service Network (CSN) comprising content services, support systems, routers, servers (e.g., application servers, AAA servers, DNS/DHCP servers), user databases, gateway devices, and other components. CSN may access other CSNs, Application Service Provider (ASP) networks, and/or the Internet. In some embodiments, MS 304 may form part of or connect to a network such as a Local Area Network (LAN), a Wireless LAN (WLAN), a Wireless Fidelity (WiFi) network, a Metropolitan Area Network (MAN), a Wireless MAN (WMAN), a Wide Area Network (WAN), a Wireless WAN (WWAN), a Personal Area Network (PAN), a Wireless PAN (WPAN), and so forth.

BS 302 and MS 304 may be arranged to communicate one or more types of information, such as media information and control information. Media information generally may refer to any data representing content meant for a user, such as image information, video information, graphical information, audio information, voice information, textual information, numerical information, alphanumeric symbols, character symbols, and so forth. Control information generally may refer to any data representing commands, instructions or control words meant for an automated system. For example, control information may be used to route media information through a system, or instruct a node to process the media information in a certain manner.

The media and control information may be communicated from and to a number of different devices or networks. In various implementations, the media information and control information may be segmented into a series of packets. Each packet may comprise, for example, a discrete data set having a fixed or varying size represented in terms of bits, bytes, octets, and so forth. It can be appreciated that aspects of the described embodiments may be applicable to various types of communication content or format, such as frames, fragments, cells, windows, units, and others.

In various embodiments media and control information may be communicated over a wireless communication channel between BS 302 and MS 304. Examples of a wireless communication channel may include, without limitation, a radio channel, infrared channel, radio-frequency (RF) channel, a portion of the RF spectrum, and/or one or more licensed or license-free frequency bands. The wireless communication channel may be arranged to support one or more point-to-point connections between BS 302 and MS 304. Multiple connections may share resources (bandwidth, time, frequency, code, and space) of the physical wireless communication channel.

In order to establish a wireless communication channel for communicating information within mobile WiMAX system 300, BS 302 and MS 304 may perform various required operations such as DL synchronization, ranging, capabilities negotiation, authentication, registration, and IP connectivity operation to enable network access.

BS 302 may periodically transmit to serving sector(s) link description messages such as a DCD message to indicate characteristics of DL channel and a UCD message to indicate characteristics of UL channel. The UCD and DCD messages may contain burst profile information, modulation information, error-correction information, preamble length, and so forth. In some embodiments, DCD and/or UCD messages periodically sent by the BS 302 base station may comprise a length value indicating the size of the CCID value (e.g., m-bits). By advertising the m-bit length value in the DCD and/or UCD message, MS 304 as well as other new and legacy mobile stations attached to BS 302 may know in advance to expect an m-bit CCID value (e.g., m<<16).

MS 304 may scan for and detect DCD and UCD messages from BD 302 to obtain DL and UL parameters and to synchronize with the DL. MS 304 may receive an uplink media access protocol MAP (UL-MAP) message and a downlink MAP (DL-MAP) message from BS 302. The UL-MAP and DL-MAP may indicate usage of the UL and DL, respectively, and define control information such as burst start times and sub-channel allocation. The UL-MAP message may contain an Information Element (IE) indicating time slots in which MS 304 can transmit during the UL subframe. BS 302 may use scheduling techniques such as Uplink Bandwidth Allocation Scheduling to determine the UL-MAP, IE, and time slots.

MS 304 may send a ranging request message to BS 302. MS 304 may transmit the ranging request message using minimum transmission power. If BS 302 does not respond, MS 304 may send additional ranging request messages using higher transmission power until a ranging response is received from BS 302. The ranging response message from BS 302 may indicate success or required time, frequency, and/or power corrections. If corrections are required, MS 304 may make the required corrections and transmit another ranging request.

After successful ranging, MS 304 may report capabilities to BS 302 for negotiation. BS 302 may accept or deny access to the MS 304 based on such capabilities. MS 304 may send BS 302 a requested modulation and coding scheme (MCS) in the DL. The MCS may support Adaptive Modulation and Coding (AMC) having variable code rate and repetition rate. The MCS may include information such as baseband modulation (e.g., QPSK, 16QAM, 64QAM), type of FEC (e.g., CC, CTC), coding rate (e.g., $½, ⅔, ¾, ⅝$), repetition rate (e.g., ×2, ×4, ×6), and so forth. MS 304 may send BS 302 a Channel Quality Indicator (CQI) report indicating channel conditions such as Physical Carrier to Interface plus Noise Ratio (CINR), Effective CINR, MIMO mode, selected sub-channel, and so forth.

After successful capability negotiation, BS 302 may authenticate MS 304 and provide necessary information (e.g., certificates, algorithms, protocols) to enable MS 304 to support encryption/decryption. MS 304 and BS 302 may exchange registration request and response messages. The registration may involve the exchange of various parameters such as IP version support, managed/non-managed support, ARQ support, classification support, CRC support, flow control, and others. MS 304 may obtain an IP address and other parameters to establish IP connectivity and download operational parameters.

To communicate within mobile WiMAX system 300, BS 302 and MS 304 may operate in accordance with various Quality of Service (QoS) levels and/or parameters. Examples of QoS levels may include unsolicited grant service (UGS), real-time polling service (rtPS), extended rtPS (ErtPS), non-real-time polling service (nrtPS), and best effort (BE) service flow. UGS may specify maximum sustained rate, maximum latency tolerance, and jitter tolerance for applications such as VoIP and interactive gaming. rtPS may specify minimum reserved rate, maximum sustained rate, maximum latency tolerance, and traffic priority for applications such as streaming audio and video. ErtPS may specify minimum reserved rate, maximum sustained rate, maximum latency tolerance, traffic priority and jitter tolerance for applications such as VoIP including voice with activity detection. nrtPS may specify minimum reserved rate, maximum sustained rate, and traffic priority for FTP applications. BE service flows may specify maximum sustained rate and traffic priority for applications such as e-mail, web browsing, and data transfer.

To support QoS and prior to any data transmission, the MAC layers of BS 302 and MS 304 may establish various types of connections. In various embodiments, the MAC layers of BS 302 and MS 304 may comprise several functional MAC layer components or modules. As shown in FIG. 3, for example, the MAC layer of BS 302 may comprise a MAC convergence sublayer (CS) component 306 and a MAC common part sublayer (CPS) component 308, and the MAC layer of MS 304 may comprise a MAC CS component 310 and a MAC CPS component 312. MAC CS components 306, 312 may be arranged to perform operations such as packet classification for outbound packets and packet reconstruction of inbound packets, as well as other operations in accordance with the described embodiments. MAC CPS components 308, 312 may be arranged to perform operations such as packet scheduling of outbound packets and packet processing of inbound packets, as well as other operations in accordance with the described embodiments.

It is to be appreciated that the described MAC layer components may be implemented by one or more chips or integrated circuits (ICs) and may comprise, for example, hardware and/or software such as logic (e.g., instructions, data, code, etc.) to be executed by a logic device (e.g., processor, core, controller, computer, etc.). Executable logic may be stored internally or externally to a logic device on one or more types of computer-readable storage media such as volatile or non-volatile memory, removable or non-removable memory, erasable or non-erasable memory, writeable or re-writeable memory, and so forth. It also is to be appreciated that the described embodiments illustrate exemplary implementations, and that the functional components and/or modules may be implemented in various other ways which are consistent with the described embodiments. Furthermore, the operations performed by such components or modules may be combined and/or separated for a given implementation and may be performed by a greater number or fewer number of components or modules.

The connections provided by the MAC layers of BS 302 and MS 304 may support various types of transmission such as unicast transmission between a sender and a specified recipient (e.g., point-to-point), multicast transmission between a sender and multiple specified recipients (e.g., point-to-multipoint), broadcast transmission between a sender and all recipients within a coverage area, and others. The type of connection may be defined according to the type of data to be transmitted and/or direction of the data traffic flow.

When data is received at the MAC layer for transmission, outbound packets are associated with a service flow. The service flow may comprise a unidirectional flow of packets to be transmitted from BS 302 to MS 304 or vice versa. The service flow may be associated with a particular QoS and various parameters such as bandwidth, latency, jitter, and other QoS parameters. For a particular service flow, one or more connections are established between BS 302 and MS 304 for communicating packets. In general, a connection is set up when a data session begins between BS 302 and MS 304 and torn down after completion of the data session.

To create a connection, BS 302 and MS 304 may exchange various messages such as DSA messages. For some service flows, such as pre-provisioned service flows, connection creation may be initiated by BS 302. In such cases, BS 302 may send a DSA-REQ message to MS 304. MS 304 may confirm creation of the connection by sending a DSA-RSP message to BS 302. For other service flows, such as non-preprovisioned service flows, connection creation may be initiated by MS 304. In such cases, MS 304 may send a DSA-REQ message, and BS 302 may respond with a DSA-RSP message to confirm creation of the connection.

In some embodiments, use of the compressed MAC header structure 102 can be signaled prior to establishing a connection between base station and the mobile station using a TLV included in one or more DSA messages (e.g., DSA-REQ message and/or DSA-RSP message). The TLV value may indicate that compressed MAC header structure 102 will be used for a particular connection to be established between BS 302 and MS 304. By signaling prior to connection creation, compressed MAC header structure 102 can be used by BS 302 and MS 304 even in legacy zones without confusing legacy mobile stations.

When established, each connection may comprise a unidirectional logical link between BS 302 and a MS 304 in either the DL or uplink UL direction. In various embodiments, DL and UL connections may comprise, for example, transport connections for the transmission of user data traffic flows and management connections for the transmission of MAC control and/or signaling data. As shown in FIG. 3, for example, DL connection 314 and UL connection 316 may be established between BS 302 and MS 304. It is to be appreciated that DL connection 314 and UL connection 316 are shown for purposes of illustration, and not limitation, and that a greater or fewer number of UL and DL connections may be established for a given implementation.

In various embodiments, one or more user connections established between BS 302 and MS 304 may be identified by a CCID value. Each CCID value may serve as a temporally unique address for data and MAC management transmissions over air-interface corresponding to a specific user. Each CCID may comprise an m-bit value (e.g., m<<16 bits). In an exemplary embodiment, each CCID value may comprise 4-bits. In various implementations, the value of each m-bit CCID value (e.g., 4-bit CCID value) may be selected as described above. For example, BS 302 may assign CCID values to user transport connections according to a certain mapping such that each CCID value may comprise an m-bit value (e.g., m<<16) derived from the 4-bit LSB portion of a truncated 16-bit CID (e.g., GMH CID). In another example, BS 302 may assign CCID values to user transport/management connections by splitting the 16-bit CID into (16-m)-bit User-ID and m-bit User-Connection-ID where each CCID value may comprise an m-bit value that is equal to the User-Connection-ID.

As shown in FIG. 3, for example, DL connection 314 may be identified by CCID-1 and UL connection 316 may be identified by CCID-x, where x may represent any positive integer value in accordance with the described embodiments. In this example, data packets to be transported over DL connection 314 from BS 302 to MS 304 may comprise VoIP data or interactive gaming data having frequent small payloads (e.g., up to of 64 octets). When received at the MAC layer of BS 302, the data packets may be associated with a service flow, and classified by the MAC CS component 306 based on CCID-1.

After being associated with a service flow, data packets may be encapsulated within MAC PDU 318 and queued for transmission over DL connection 314. In various embodiments, MAC PDU 318 may be implemented by an OFDMA frame. For example, MAC PDU 318 may be included in a DL subframe of the OFDMA frame.

MAC PDU 318 may comprise packet data structure 100 as described above with reference to FIG. 1. For example, MAC PDU 318 may comprise compressed MAC header structure 102 including CCID field 104 containing the m-bit value of CCID-1. In some embodiments, the compressed MAC header structure 102 may be used exclusively in permutation zones designated for VoIP and/or interactive gaming user traffic. At the BS 302, MAC PDU 318 may be scheduled by MAC CPS component 308 and transmitted over DL connection 314 identified by CCID-1.

As described, packet data structure 100 may be used in both DL and UL directions. Accordingly, in some embodiments, MAC PDU 318 may comprise compressed MAC header structure 102 including CCID field 104 containing the m-bit value of CCID-x. In such embodiments, MAC PDU 318 may be transported over UL connection 316 identified by CCID-x.

As described, CCID values may be used to replace conventional transport CIDs (e.g., 16-bit GMH CIDs) for transport connection between BS 302 and MS 304. It can be appreciated, however, that CCID values also may be used to replace conventional management connection identifiers such as basic, primary, and secondary CIDs. The management connections may comprise DL or UL connections and may correspond to different QoS levels of management traffic including basic, primary, and secondary QoS levels. The management connections may be used, for example, to dynamically manage the QoS parameters associated with a particular service flow that define the transmission ordering and scheduling on the air interface.

To maintain QoS among connections, BS 302 may evaluate BW-REQ messages for each connection and grant bandwidth to MS 304 as well as other mobile stations. In various embodiments, bandwidth may be requested on a CCID basis and allocated to a particular connection and/or particular mobile stations (e.g., MS 304). For example, MS 304 may send a BW-REQ message to BS 302 during a contention period. The BW-REQ message may report the current queue size of each connection to indicate bandwidth demand. In various implementations, bandwidth may be requested periodically, in response to polling, using unicast transmission techniques, using contention methods, and/or and using other request mechanisms.

Figure 4:
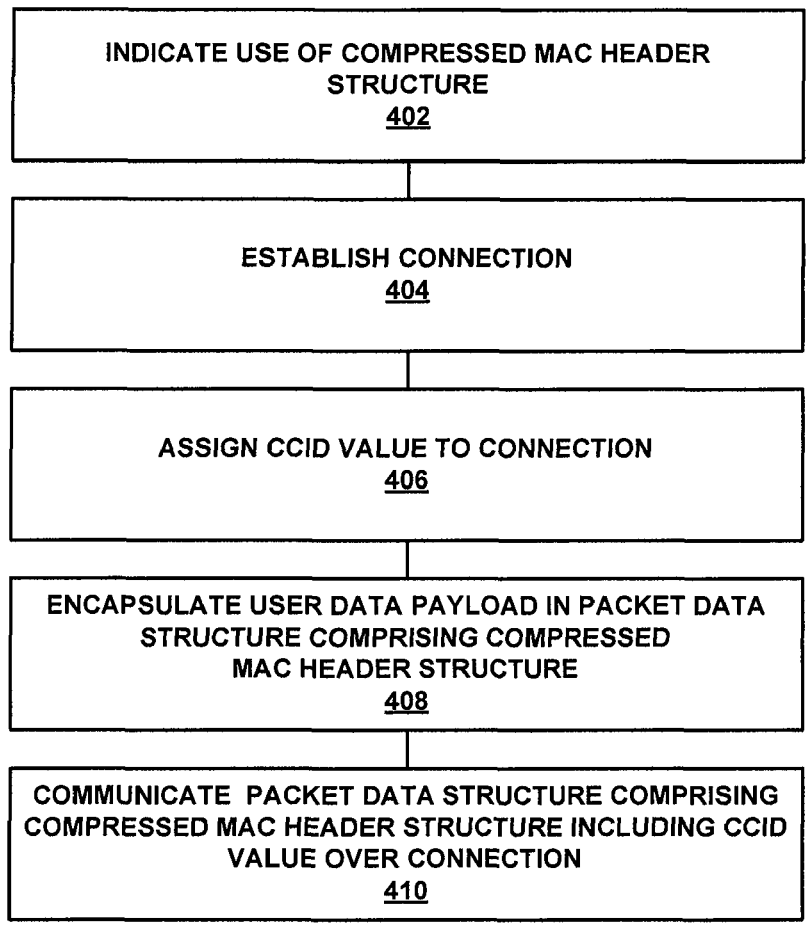
FIG. 4 illustrates a MAC header overhead reduction logic flow in accordance with various embodiments.

FIG. 4 illustrates one embodiment of a logic flow 400 for MAC header overhead reduction. In various embodiments, logic flow 400 may be performed by various systems and/or devices and may be implemented as hardware, software, and/or any combination thereof, as desired for a given set of design parameters. For example, logic flow 400 may be implemented by a logic device (e.g., computer) and/or logic (e.g., computer program instructions) to be executed by a logic device. For purposes of illustration, and not limitation, reference is made to FIG. 1.

Logic flow 400 may comprise indicating use of a compressed MAC header structure 102 (block 402). Compressed MAC header structure 102 may comprise CCID field 104 arranged to include an m-bit CCID value (e.g., m<<16) for identifying a DL or UL connection between a base station and a mobile station. In various embodiments, use of compressed MAC header structure 102 may be indicated prior to establishing a connection between a base station and a mobile station in order to ensure that both new and legacy mobile stations can schedule and receive service from the base station.

In some embodiments, DCD and/or UCD messages periodically sent by a base station may advertise a length of the m-bit CCID value. In some embodiments, use of the compressed MAC header structure 102 may be signaled using a TLV included in one or more DSA messages (e.g., DSA-REQ message and/or DSA-RSP message). In some embodiments, compressed MAC header structure 102 may be used exclusively in certain permutation zones such as permutation zones corresponding to VoIP and/or interactive gaming user traffic.

Logic flow 400 may comprise establishing a connection (block 404). The connection may comprise a unidirectional logic link between a base station and a mobile station in either a DL or UL direction. In various implementations, DL or UL connection may comprise a transport connection for the transmission of user data traffic flows or a management connection for the transmission of MAC control and/or signaling data. The connection may be established by the MAC layers of the base station and mobile station.

Logic flow 400 may comprise assigning a CCID value to the connection (block 406). In various embodiments, an m-bit CCID value may serve as a temporally unique address and include a fewer number of bits than a conventional CID. It is noted that the m-bit CCID value may be used in either the DL or UL direction and may be used to replace transport connection CIDs as well as management connection (e.g., basic, primary, and secondary) CIDs. In some embodiments, a base station may assign CCID values to user transport connections according to a certain mapping such that each CCID value may comprise an m-bit value (e.g., m<<16) derived from the 4-bit LSB portion of a truncated 16-bit CID (e.g., GMH CID). In an alternative embodiment, the base station may assign CCID values to user transport/management connections by splitting the 16-bit CID into (16-m)-bit User-ID and m-bit User-Connection-ID where each CCID value may comprise an m-bit value that is equal to the User-Connection-ID.

Logic flow 400 may comprise encapsulating a user data payload in a packet data structure 100 comprising compressed MAC header structure 102 (block 408). In various embodiments, user data packets may be associated with a service flow and classified according to CCID value. After being associated with a service flow, data packets may be encapsulated within packet data structure 100 and queued for transmission. Packet data structure 100 may be implemented by a MAC PDU and/or OFDMA frame.

In some embodiments, packet data structure 100 comprising compressed MAC header structure 102 may be used to encapsulate small data packets, such as VoIP and interactive gaming data packets. In some embodiments, the maximum size of the user data payload is 64 octets, which is suitable for VoIP and interactive gaming applications. Compressed MAC header structure 102 may comprise packet length field 106 including an n-bit packet length value as small as 6 bits (e.g., n=6).

Logic flow 400 may comprise communicating packet data structure 100 comprising compressed MAC header structure 102 including the CCID value over the connection (block 410). In various embodiments, packet data structure 100 may be scheduled at the MAC layer and transmitted over the connection identified by the CCID value. It can be appreciated that, in some cases, the conventional 10 octet overhead corresponding to GMH (6 octets) and CRC (4 octets) for each user data packet may be reduced to 4 octets corresponding to the compressed MAC header field 102 (2 octets) and FCS field 116 (2 octets). This reduction in MAC header overhead may translate directly into higher capacity and performance for such small-packet applications such as VoIP and interactive gaming applications.

Figure 5:
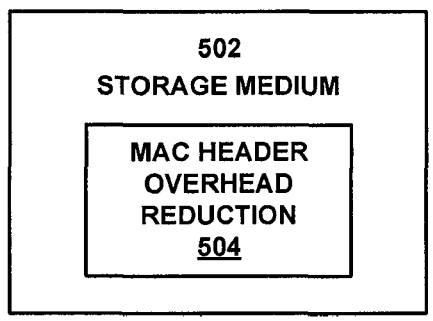
FIG. 5 illustrates an article of manufacture storing MAC header overhead reduction logic in accordance with various embodiments.

FIG. 5 illustrates one embodiment of an article of manufacture 500. As shown, article 500 may comprise a computer-readable storage medium 502 to store MAC header overhead reduction logic 504. Article 500 may be implemented by various systems and/or devices in accordance with the described embodiments.

Article 500 and/or computer-readable storage medium 502 may include one or more types of computer-readable storage media capable of storing data, including volatile memory or, non-volatile memory, removable or non-removable memory, erasable or non-erasable memory, writeable or re-writeable memory, and so forth. Article 500 and/or computer-readable storage medium 502 may store MAC header overhead reduction logic 504 comprising executable computer program instructions that, when executed by a computer, cause the computer to perform methods and/or operations in accordance with the described embodiments.

MAC header overhead reduction logic 504 may comprise, or be implemented as, software, a software module, an application, a program, a subroutine, instructions, an instruction set, computing code, words, values, symbols or combination thereof. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language, such as C, C++, Java, BASIC, Perl, Matlab, Pascal, Visual BASIC, assembly language, and others.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

It is also worthy to note that any reference to "various embodiments," "one embodiment," or "an embodiment" means that a particular feature, structure, or characteristic described in connection with the embodiment is included in at least one embodiment. Thus, appearances of the phrases "in various embodiments," "in one embodiment," or "in an embodiment" in places throughout the specification are not necessarily all referring to the same embodiment. Furthermore, the particular features, structures or characteristics may be combined in any suitable manner in one or more embodiments.

Although some embodiments may be illustrated and described as comprising exemplary functional components or modules performing various operations, it can be appreciated that such components or modules may be implemented by one or more hardware components, software components, and/or combination thereof.

Some of the figures may include a flow diagram. Although such figures may include a particular logic flow, it can be appreciated that the logic flow merely provides an exemplary implementation of the general functionality. Further, the logic flow does not necessarily have to be executed in the order presented unless otherwise indicated. In addition, the logic flow may be implemented by a hardware element, a software element executed by a computer, or any combination thereof.

Some embodiments may be implemented as an article of manufacture comprising a computer-readable storage medium to store executable computer program instructions for performing various operations as described herein. In such embodiments, a computer may include any suitable computer platform, device, system, or the like implemented using any suitable combination of hardware and/or software.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within registers and/or memories into other data similarly represented as physical quantities within the memories, registers or other such information storage, transmission or display devices.

It is worthy to note that some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, also may mean that two or more elements are not in direct contact with each other, but yet still co-operate or interact with each other. With respect to software elements, for example, the term "coupled" may refer to interfaces, message interfaces, API, exchanging messages, and so forth.

While certain features of the embodiments have been illustrated as described above, many modifications, substitutions, changes and equivalents will now occur to those skilled in the art. It is therefore to be understood that the appended claims are intended to cover all such modifications and changes as fall within the true spirit of the embodiments.

The invention claimed is:

1. A packet data structure stored on a non-transitory computer-readable medium to reduce medium access control (MAC) overhead, the packet data structure comprising:
a compressed media access control (MAC) header structure comprising a compact connection identifier (CCID) field, the CCID field to include a m-bit CCID value for identifying a connection comprising a unidirectional logical link between a base station and a mobile station in either a downlink or an uplink direction, the m-bit CCID value having a fewer number of bits than a connection identifier (CID) for a Generic MAC Header (GMH) or a Bandwidth Request (BW-REQ) header and the m-bit CCID value comprising a least significant bit (LSB) portion of a CID, wherein use of the compressed MAC header structure is indicted prior to establishing a connection between the base station and the mobile station using a type-length-value (TLV) included in one or more dynamic service flow addition (DSA) messages and wherein the compressed MAC header structure is designated for use exclusively in one or more permutation zones.

2. The packet data structure of claim 1, the m-bit CCID value comprising 4 bits.

3. The packet data structure of claim 1, further comprising a packet length field to include an n-bit packet length value, an encryption control (EC) field to include a 1-bit EC value, a cyclic redundancy check (CRC) indicator field (CI) to include a 1-bit CT value, and header check sequence (HCS) field to include a k-bit HCS value.

4. The packet data structure of claim 3, the n-bit length value comprising 6 bits.

5. The packet data structure of claim 3, the k-bit HCS value comprising 4 bits.

6. The packet data structure of claim 5, the user data payload comprising at least one of Voice Over Internet Protocol (VoIP) data and interactive gaming data.

7. The packet data structure of claim 1 further comprising a user data payload field to include a user data payload having a maximum packet length of 64 octets.

8. The packet data structure of claim 1 further comprising a frame check sequence (FCS) field to include a CRC value comprising 2 octets.

9. The packet data structure of claim 1 comprising a MAC protocol data unit (PDU).

10. The packet data structure of claim 1 comprising an Orthogonal Frequency Division Multiple Access (OFDMA) frame.

11. An apparatus comprising:
a media access control (MAC) layer comprising one or more components to establish a unidirectional logical link between a base station and a mobile station in either a downlink or uplink direction and to assign an m-bit compact connection identifier (CCID) value of a compressed MAC header structure to the connection, the m-bit CCID value having a fewer number of bits than a connection identifier (CID) for a Generic MAC Header (GMH) or a Bandwidth Request (BW-REQ) header and the m-bit CCID value comprising a least significant bit (LSB) portion of a CID, wherein use of the compressed MAC header structure is indicted prior to establishing the logical link between the base station and the mobile station using a type-length-value (TLV) included in one or more dynamic service flow addition (DSA) messages and wherein the compressed MAC header structure is designated for use exclusively in one or more permutation zones.

12. The apparatus of claim 11 comprising a wireless device to operate in accordance with one or more Institute for Electronic and Electrical Engineers (IEEE) standards.

13. The apparatus of claim 12, wherein the IEEE 802.16 standards comprise one or more of IEEE 802.16e-2005 and IEEE 802.16m.

14. A system comprising the apparatus of claim 11 coupled to an antenna.

15. A method comprising:
establishing a connection comprising a unidirectional logical link between a base station and a mobile station in either a downlink or uplink direction;
assigning an m-bit compressed connection identifier (CCID) value to the connection, the m-bit CCID value having a fewer number of bits than a connection identifier (CID) for a Generic MAC Header (GMH) or a Bandwidth Request (BW-REQ) header and the m-bit CCID value comprising a least significant bit (LSB) portion of a CID; and
communicating a packet data structure comprising a compressed media access control (MAC) header structure over the connection, the compressed MAC header structure comprising a CCID field including the CCID value, wherein use of the compressed MAC header structure is indicted prior to establishing the connection between the base station and the mobile station using a type-length-value (TLV) included in one or more dynamic service flow addition (DSA) messages and wherein the compressed MAC header structure is designated for use exclusively in one or more permutation zones.

16. The method of claim 15 further comprising indicating use of the compressed MAC header structure by advertising a length of the CCID value in a link description message.

17. The method of claim 15 further comprising indicating use of the compressed MAC header structure using a type-length-value (TLV) included in a dynamic service flow addition (DSA) message.

18. The method of claim 15 further comprising assigning CCID values to transport connections according to a certain mapping such that each CCID value comprises an m-bit value derived from a least significant bit (LSB) portion of a truncated GMH CID or BW-REQ CID.

19. An article of manufacture comprising a non-transitory computer-readable storage medium storing executable computer program instructions that when executed by a computer cause the computer to perform the method of claim 15.

20. A packet data structure stored on a non-transitory computer-readable medium to reduce medium access control (MAC) overhead, the packet data structure comprising:
a compressed media access control (MAC) header structure comprising
a connection identifier (CID) field to include a 4-bit identifier value for identifying a connection comprising a unidirectional logical link between a base station and a mobile station in either a downlink or an uplink direction, the 4-bit identifier value having a fewer number of bits than a CID for a Generic MAC Header (GMH) or a Bandwidth Request (BW-REQ) header;
a length field to include a 7-bit packet length value; and
a sequence field to include a 4-bit sequence value;
wherein use of the compressed MAC header structure is indicted prior to establishing the connection between the base station and the mobile station using a type-length-value (TLV) included in one or more dynamic service flow addition (DSA) messages and wherein the compressed MAC header structure is designated for use exclusively in one or more permutation zones.

21. The packet data structure of claim 20, comprising a user data payload field to include a user data payload having a maximum packet length of 64 octets.

22. The packet data structure of claim 21, the user data payload comprising at least one of Voice Over Internet Protocol (VoIP) data and interactive gaming data.

23. The packet data structure of claim 20 comprising a MAC protocol data unit (PDU).

24. The packet data structure of claim 20 comprising an Orthogonal Frequency Division Multiple Access (OFDMA) frame.

25. The packet data structure of claim 20, the 4-bit identifier value comprising a least significant bit (LSB) portion of a 16-bit identifier.

26. The packet data structure of claim 20, the 7-bit packet length field to indicate the size of a user data payload to be included in a user data payload field.

27. The packet data structure of claim 20, the 4-bit sequence value to provide error protection for the compressed MAC header structure.

* * * * *

UNITED STATES PATENT AND TRADEMARK OFFICE
CERTIFICATE OF CORRECTION

| | | |
|---|---|---|
| PATENT NO. | : 7,974,312 B2 | Page 1 of 1 |
| APPLICATION NO. | : 11/831299 | |
| DATED | : July 5, 2011 | |
| INVENTOR(S) | : Ahmadi et al. | |

It is certified that error appears in the above-identified patent and that said Letters Patent is hereby corrected as shown below:

On Title page, Item (54), in "Title" in column 1, line 5, delete "(WIMAX)" and insert -- (WiMAX) --, therefor.

In column 1, line 5, delete delete "(WIMAX)" and insert -- (WiMAX) --, therefor.

In column 16, line 42, in Claim 3, delete "CT" and insert -- CI --, therefor.

Signed and Sealed this
Fourth Day of October, 2011

David J. Kappos
*Director of the United States Patent and Trademark Office*